(12) United States Patent
Peracchi

(10) Patent No.: US 12,544,330 B2
(45) Date of Patent: Feb. 10, 2026

(54) LONG-LASTING REABSORBABLE SUBCUTANEOUS IMPLANT WITH SUSTAINED RELEASE OF PRE-CONCENTRATED PHARMACOLOGICALLY ACTIVE SUBSTANCE IN POLYMER FOR THE TREATMENT OF CHRONIC ADRENAL INSUFFICIENCY OR HYPOCORTISOLISM

(71) Applicant: Edson Luiz Peracchi, Curitiba (BR)

(72) Inventor: Edson Luiz Peracchi, Curitiba (BR)

( * ) Notice: Subject to any disclaimer, the term of this patent is extended or adjusted under 35 U.S.C. 154(b) by 538 days.

(21) Appl. No.: 18/000,117

(22) PCT Filed: Aug. 31, 2020

(86) PCT No.: PCT/BR2020/050345
§ 371 (c)(1),
(2) Date: Nov. 28, 2022

(87) PCT Pub. No.: WO2021/237321
PCT Pub. Date: Dec. 2, 2021

(65) Prior Publication Data
US 2023/0190641 A1 Jun. 22, 2023

(30) Foreign Application Priority Data

May 29, 2020 (BR) .......................... 1020200109235

(51) Int. Cl.
*A61K 9/00* (2006.01)
*A61K 31/573* (2006.01)
*A61K 47/34* (2017.01)

(52) U.S. Cl.
CPC .......... *A61K 9/0024* (2013.01); *A61K 31/573* (2013.01); *A61K 47/34* (2013.01)

(58) Field of Classification Search
CPC . A61K 9/0085; A61K 9/0024; A61B 17/3401
See application file for complete search history.

(56) References Cited

U.S. PATENT DOCUMENTS

| 4,957,119 A | 9/1990 | deNijs |
| 9,980,850 B2 | 5/2018 | Baillie et al. |
| 2007/0031472 A1 | 2/2007 | Huang |
| 2019/0298646 A1 | 10/2019 | Allred |

FOREIGN PATENT DOCUMENTS

| BR | 102016018206-9 | 3/2018 |
| WO | WO2007089544 | 8/2007 |
| WO | WO2008157057 | * 12/2008 |
| WO | WO2011139595 | * 11/2011 |
| WO | 102016018206 | * 8/2016 |

* cited by examiner

*Primary Examiner* — Robert A Wax
*Assistant Examiner* — Kimberly Barber
(74) *Attorney, Agent, or Firm* — LaMorte & Associates P.C.

(57) ABSTRACT

Long-acting resorbable subcutaneous implant with extended release of pre-concentrated pharmacologically active substance in polymer for treatment of chronic adrenal insufficiency. The implant is inserted subcutaneously and has continuous release of the active ingredient for an extended period of time. The implant may have in its constitution only hydrocortisone but is preferably formed by hydrocortisone particles homogeneously dispersed in a bio erodible and bioabsorbable polymer matrix. Such a polymer matrix may be formed of a polymer or a polymer blend. The release of the drug in this system occurs through diffusion, at a relatively constant rate, and it is possible to change the rate of release of the drug through the thickness or material of this membrane.

7 Claims, 2 Drawing Sheets

LONG-LASTING REABSORBABLE SUBCUTANEOUS IMPLANT WITH SUSTAINED RELEASE OF PRE-CONCENTRATED PHARMACOLOGICALLY ACTIVE SUBSTANCE IN POLYMER FOR THE TREATMENT OF CHRONIC ADRENAL INSUFFICIENCY OR HYPOCORTISOLISM

The present invention is directed to the medical sector and comprises a long-acting resorbable subcutaneous implant with extended release of pharmacologically active substance pre-concentrated in polymer for treatment of chronic adrenal insufficiency or hypocortisolism.

BACKGROUND OF THE INVENTION

Chronic adrenal insufficiency, or hypercortisolism, is a pathology and can be divided into two types: primary and secondary. Chronic primary adrenal insufficiency, also known as Addison's Disease (AD), is characterized by a compromise of the zones responsible for the production of mineralocorticoids and glucocorticoids, resulting in a deficit of basal cortisol production and elevated levels of adrenocorticotropic hormone (ACTH). Chronic secondary adrenal insufficiency is characterized by a failure of the pituitary gland to secrete adrenocorticotropic hormone (ACTH), and the disease is then characterized by low ACTH and cortisol production, without compromising the secretion of mineral corticosteroids. In both cases there is a loss in the production of androgens and adrenal androgen precursors, such as DHEA.

Proper diagnosis and treatment are critical to ensure the quality of life of patients with chronic adrenal insufficiency or hypercortisolism.

Patients affected by this disease have a reduced quality of life from the point of view of health, increased cardiovascular risk factors, risk of osteoporosis, increased mortality and often take time to start receiving treatment because they have clinical signs very similar to those of other diseases. An adrenal crisis is a serious complication that can occur in patients who have the disease and are not undergoing treatment, or who are undertreated. An adrenal crisis is triggered by stressful events to the patient, such as infections, traumas, surgeries, dehydration. In normal patients, after a stress event, the system responds by increasing cortisol secretion. In patients affected by the disease, there is a deficiency in cortisol secretion, and this deficiency of secretion in the face of stressful events culminates in the adrenal crisis. An adrenal crisis, if not treated quickly, can lead to death.

Treatment for primary chronic adrenal insufficiency is done by replacement of glucocorticoids and mineralocorticoids. For secondary chronic adrenal insufficiency, treatment is done by replacing glucocorticoids only. The most commonly used glucocorticoids are hydrocortisone and cortisone acetate. The recommended dosage for patients with chronic adrenal insufficiency is 20-30 mg per day of oral hydrocortisone (HC), equivalent to 25-37.5 mg of cortisone acetate (CA), divided into two or three doses, half or two thirds of the total dose given in the morning, soon after waking. Another option of glucocorticoid is prednisolone, which is long acting. Its dosage is 3 to 5 mg per day, in one dose only or divided into two doses. The mineralocorticoid used, only for patients with Addison's disease, is fludrocortisone and the dosage is 0.05-0.2 mg per day, taken once in the morning.

The goal of hydrocortisone replacement treatment in patients with chronic adrenal insufficiency is to optimize the quality of life of these patients and minimize the side effects of treatment. This should be done by adjusting the dosages of the medication according to the clinical symptoms of the patient and by attempting to mimic the natural cycle of cortisol secretion, also known as the circadian cycle. The circadian cycle is characterized by an increase in cortisol secretion during the day, mainly by the influence of light, and a decrease in cortisol secretion at night, to allow rest.

Among the available drug options for the treatment of chronic adrenal insufficiency there are some aspects to be considered. In order for cortisone acetate to become biologically active for use in the body it must first be metabolized to cortisol (hydrocortisone) via an enzyme in the liver. The ability of this enzyme may limit the amount of cortisone acetate converted to cortisol, and the use of hydrocortisone itself is recommended, rather than cortisone acetate.

Prednisolone has a much longer biological half-life than hydrocortisone and cortisone acetate, which could result in much greater glucocorticoid activity at night. The increased activity of this glucocorticoid at night is unfavorable to treatment since the concentration of this drug in the body should be as close as possible to the circadian cycle.

Hydrocortisone is the most used and indicated drug for the treatment of chronic adrenal insufficiency. However, although oral hydrocortisone treatment reestablishes adrenal hormone levels, it does not restore the normal cortisol biorhythm, according to the circadian cycle. Studies show that by measuring the circulating level of cortisol, treatment with oral hydrocortisone generates in the body a very high dose of medication immediately after oral administration and leaves it undertreated within a few hours after its administration.

Furthermore, other studies indicate that many patients with primary adrenal insufficiency under conventional replacement treatment with glucocorticoids and mineralocorticoids still present some symptoms such as fatigue, nausea, and headache. This may be due to the non-possibility of mimicking the natural circadian rhythm of cortisol since the natural peak begins with the onset of rapid eye movement during the early morning hours and the peak of hydrocortisone in the morning occurs sometime after the drug has been taken orally. This transient adrenal insufficiency early in the morning is responsible for the symptoms of fatigue, lassitude, nausea, and headache, which improve 30-60 minutes after taking the medication.

In addition to the oral route, there is another form of administration of hydrocortisone to patients with chronic adrenal insufficiency, through an insulin pump containing the drug. A study was conducted comparing hydrocortisone treatment in patients affected by Addison's disease orally and by continuous subcutaneous infusion of the drug. Continuous subcutaneous infusion was performed using an insulin pump. During the day, different dosages of a hydrocortisone solution were released by the device in the body and patients had the task of changing the solution and the infusion apparatus every three days. The results found in the study demonstrated that the continuous subcutaneous infusion technology of the drug can reestablish the circadian rhythm of cortisol and normalize the morning levels of ACTH in patients with Addison's disease, a result that is not found with oral treatment. Furthermore, oral treatment resulted in a substantial change in the pattern of glucocorticoid metabolites and enzymatic metabolic activity, while continuous subcutaneous infusion restored glucocorticoid metabolism to near normality. Treatment by continuous subcutaneous infusion also produced a more physiological circadian cortisol biorhythm and caused changes in the metabolism of glucocorticoids similar to that of a healthy person.

Traditional routes of administration, both oral and continuous subcutaneous infusion, have several disadvantages compared to the innovation proposed herein. One of the disadvantages is lower therapeutic adherence. According to the World Health Organization, therapeutic adherence is determined by the interaction between the system and the health team, socioeconomic factors, factors related to the patient, treatment and disease. Adherence to treatment is one of the main factors related to the success or failure of a therapeutic drug approach. Often the therapeutic result is not as positive as expected due to the patient's conduct, for various reasons he does not continue the treatment and, with this, the drug does not produce the expected effect.

Chronic diseases, such as primary and secondary chronic adrenal insufficiency, cause the patient to have to take at least one drug, often more than once a day, indefinitely to keep the disease under control. The increase in the number of medications taken by the patient per day decreases adherence to treatment by about 20% and the medications used in multiple doses also decrease adherence compared to a single dose.

In addition, approximately 50% of patients with chronic diseases do not take their medications as prescribed. The constancy in medication intake among these patients is very low and decreases dramatically after the first six months of therapy. Chronic diseases are long-lasting and can significantly impair the quality of life of those who suffer from them due to the potential of a high physical, emotional and/or economic burden. The management of these chronic conditions requires continuous attention and commitment of patients and the combination of long-term treatment with the absence of symptoms after medication decreases adherence to treatment in traditional drug approaches.

The oral route is the most susceptible to failure because it is always dependent on the active participation (or compliance) of the patient. It is common for patients to make correct use of the drug only around 5 days after consultation with the doctor or when they have acute symptoms. However, to obtain all the benefits of drug therapy, it is essential that the patient uses the recommended doses at the time intervals indicated by the physician. In the subcutaneous infusion, there is also the need for patient cooperation to exchange the solution with the drug, cleaning the device and re-insert the needle two to three times a week. Furthermore, the patient is responsible for the correct storage of the drug solution that will be used, a very important factor for the success of the treatment. This dependence on the patient greatly worsens the therapeutic adherence and causes the treatment to be compromised.

The most effective way to increase treatment adherence by patients is to simplify medication dosages. For many chronic diseases, the development of drugs with extended release made it possible to simplify dosages.

Another disadvantage in the oral use of hydrocortisone is the ease in making improper use of the prescribed medication, increasing the risks of underdoses or supraphysiological doses, leading patients to a possible recurrence of symptoms, compromising their general state of treatment.

Thus, it is possible to find a third option known as bioabsorbable hydrocortisone implants or pellets for the treatment of chronic adrenal insufficiency. Such implants present an extended release of the drug for a long period of time, to treat the disease, make the treatment independent of the patient taking medication and try to reproduce the circadian cycle of cortisol in the body, thus improving its clinical symptoms.

The terms "implant" or "pellet" refer to this pharmaceutical form already consolidated in the official collections of standards for medicines and pharmaceutical substances. They are characterized by being solid and sterile preparations of suitable size and shape for parenteral implantation and release of the active substance(s) over an extended period.

The terms "extended release", "slow release" or "sustained release" refer to the form of drug release through the implant, which occurs continuously and gradually for an extended period and does not result in an immediate and concentrated release of the drug into the body.

Biodegradable polymers or bio erodible polymers refer to a polymer that degrades in vivo and that its erosion over time occurs concurrently with and/or after the release of the therapeutic agent. A biodegradable polymer can be a homopolymer, copolymer, or a polymer compressing more than two polymer units. In some cases, a biodegradable polymer can include mixing two or more homopolymers or copolymers.

Biodegradable implants or bio erodible implants can be understood as implants that have some mechanism that gradually reduces their mass for an extended period of release. The forces involved in this mass reduction may be cellular interaction or shear forces on the implant surface. Furthermore, erosion and gradual dissolution of its components is possible. The terms also refer to the total degradation and absorption by the body that occurs at the site where the implants were applied, excluding the need to remove the implants at the end of the treatment.

Referring to patents directed to resorbable implants, U.S. Pat. No. 4,957,119 mentions an implant of polymeric material that can release a contraceptive agent for a relatively long time when adjusted subcutaneously or locally. The implant comprises an ethylene/vinyl acetate copolymer core material that functions as a matrix for a contraceptive substance, an ethylene/vinyl acetate membrane surrounding the core material, and a contact layer at the interface of the core material and membrane that prevents separation of the core material from the membrane.

Although claiming a resorbable implant, the record U.S. Pat. No. 4,957,119 uses different active substances, its production is carried out by means of extrusion and the release period of the active substance is very long (at least 1 year), distinguishing itself from the resorbable subcutaneous implant of the present invention.

The second patent U.S. Pat. No. 9,980,850 describes a bioerodible contraceptive implant and methods of use in the form of a controlled release bioerodible bead for subdermal implantation. The bioerodible sediment provides extended release of a contraceptive agent for an extended period. Bioerosion products are water soluble, bioresorbed or both, avoiding the need for surgical removal of the implant.

As with the first prior art record cited, this record U.S. Pat. No. 9,980,850 also uses distinct active substances the release period of the active substance is very long (from 6 months to 4 years) and the preferred method for manufacturing the granules is the hot melt molding process.

Noting the deficiencies and pre-existing problems in conventional treatments of chronic adrenal insufficiency or hypercortisolism, the present invention aims to treat the pathology, improve the clinical symptoms of patients and try to reproduce the circadian rhythm by means of a resorbable subcutaneous implant, with sustained release of the active substance, capable of releasing the drug directly into the bloodstream in order to avoid hepatic metabolism. Another advantage of the present invention is the improvement of the therapeutic adherence of patients, since they do not need to remember to use the drugs periodically. Furthermore, at the end of the treatment with the implants, it is not necessary to remove them, only to reinsert new ones to maintain the treatment.

DESCRIPTION OF THE DRAWINGS

For a better understanding of the present invention, the following drawings are attached.

DETAILED DESCRIPTION OF THE INVENTION

The present application for privilege of invention is a biodegradable hydrocortisone implant in polymer matrix. The implant is inserted subcutaneously and has continuous release of the active ingredient for an extended period of time. This release aims to ensure an efficient, constant and extended serum level of the drug for the treatment of chronic adrenal insufficiency.

Figure 1:
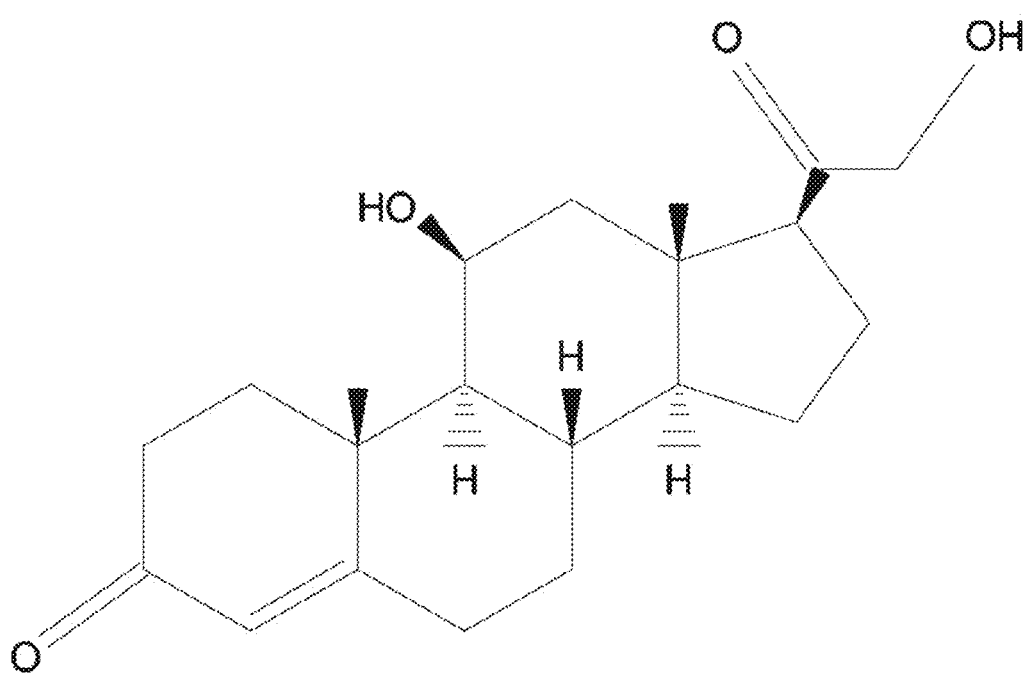
FIG. 1—shows a representation of the chemical structure of the hydrocortisone substance.

The "active substance", "active ingredient" or "drug" refers to the substance hydrocortisone, which has the chemical structure shown in FIG. 1.

The implant of the present invention may have in its constitution only hydrocortisone but is preferably formed of hydrocortisone particles homogeneously dispersed in a bioerodible and bioabsorbable polymer matrix. Such a polymer matrix may be formed of a polymer or a polymer blend. The amount of hydrocortisone present in the implant may range from 5 to 250 mg per implant and its composition has from 1 to 20% biodegradable polymer in proportion to its weight. Preferably it should have from 40 to 200 mg and from 2 to 10% biodegradable polymer in proportion to weight.

The biodegradable polymer used may be: Poly(D-lactic acid), Poly(L-lactic acid), Poly(racemic lactic acid), Poly(glycolic acid), Poly(caprolactone), methylcellulose, ethyl cellulose, hydroxy propyl cellulose (HPC), hydroxy propyl methyl cellulose (HPMC), polyvinylpyrrolidone (PVP), poly(vinyl alcohol) (PVA), poly(ethylene oxide) (PEO), polyethylene glycol, starch, natural and synthetic gum, and wax.

Implants can have any size, shape or structure that facilitates their manufacture and intradermal insertion, however, to obtain a more constant and uniform release of the active ingredient it is necessary to use geometric shapes that maintain the surface area over time.

Figure 2:
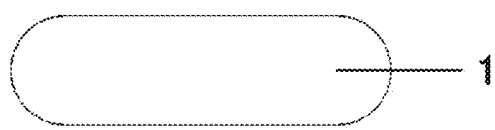
FIG. 2—shows a dimensional design of the bioabsorbable hydrocortisone implant.

Thus, the implant developed and demonstrated in the present application adopts the cylindrical, rod-shaped pattern, provided with straight or rounded tips, with a length between 2 to 25 mm and a diameter of 1 to 6 mm. The schematic drawing of an example implant size (1) is shown in FIG. 2.

The manufacture of the hydrocortisone implant can be made from the addition of 5 to 250 mg of the drug in the solution of the biodegradable polymer matrix chosen in a proportion of 1 to 20% in relation to the weight of the hydrocortisone, with the formation of a homogeneous mixture. If the polymer solvent is not also a hydrocortisone solvent, it will be dispersed in the form of particles or suspension, and a mixer can be used to make the solution homogeneous. This solution is then dried and subsequently shaped to the shape of the implant (1) or other desired shape.

Another possible form of manufacturing the hydrocortisone implant is from mixing 5 to 250 mg of the drug and 1 to 20% of the chosen biodegradable polymer matrix with respect to the weight of that drug, in its dry, powdered forms. The drug and the polymer matrix are added in a suitable container and the mixture is homogenized.

The mixture of active ingredients for manufacturing the implant may be shaped from pressure or heat so as not to compromise the efficacy of the drug or degrade the polymeric material. Technique options for implant molding can be: injection molding, hot molding, compression molding, or extrusion molding.

For the present invention, the technique chosen was compression molding. In this technique, the mixture of the active ingredients, in powder form, is added to a mold and there is the application of mechanical force under the mixture, generating the compression of the particles and consequently the molding of the implant in the shape (1). Then there is the filling and sterilization of the hydrocortisone implant. Its sterilization can be done by heat or gamma rays. Sterilization is preferably done by heat, in an oven at 90° C., for 1 hour.

The implant may have a polymeric coating membrane, with a thickness between 0.1 to 0.7 mm. The polymer used for the coating must be bioabsorbable and allow the passage of the active substance. The coating of the implant is preferably done by dipping the implant in a polymer solution. The coating may cover the entire surface of the implant including the edges, only its longitudinal surface with the edges uncoated or coated only on the edges of the implant without coating its length. The polymers that can be used for the coating are: poly(lactic-co-glycolic acid) (PLGA) and copolymers of D, L-lactic acid.

Figure 3:
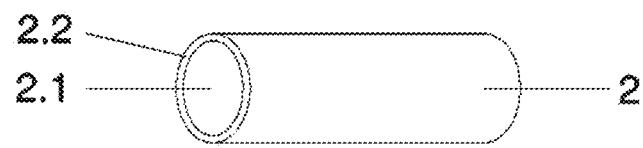
FIG. 3—shows a dimensional design of the non-bioabsorbable hydrocortisone implant.

Yet another implant option for treating chronic adrenal insufficiency is non-biodegradable implants. Non-biodegradable or non-bioerodible implants (2) (FIG. 3) have a central core (2.1) formed by a polymeric matrix in the percentage of 1 to 20% in relation to the weight of the drug, in this case 5 to 250 mg of hydrocortisone, the core being surrounded by a non-degradable polymeric membrane (2.2) that controls the release rate of the drug.

The material of manufacture of the polymeric membrane surrounding the implant may be: silicone, urethane, acrylates and their copolymers, polyvinylidene fluoride copolymers, ethylene polyethylene vinyl acetate-vinyl, dimethylpolysiloxane. This membrane has a thickness of 0.2 to 1 mm and is molded in specific equipment. After molding the membrane from the polymeric material, the active ingredient mixture is inserted, forming the central core (2.1) of the implant (2). The polymers used in the polymer matrix of the blend adopt the same compounds and process as the bioabsorbable implant.

The release of the drug in this system occurs through diffusion, at a relatively constant rate, and it is possible to change the rate of release of the drug through the thickness or material of that membrane. In this system, it is necessary to remove the implant at the end of the treatment.

The treatment for chronic adrenal insufficiency using hydrocortisone implants should be defined according to the severity of the symptoms and clinical condition of the patient. The production of cortisol in normal patients, not affected by the disease, is approximately 8.7 to 12.2 mg per day. The implant has a release of 0.6 to 1.2 mg of hydrocortisone per day, depending on the amount of drug present in it. Treatment with implants acts as a parallel production of extended release of hydrocortisone, since patients with chronic adrenal insufficiency have endogenous production of cortisol, only lower than normal patients. In practice, with the use of 3-5 hydrocortisone implants, with release between 1.8 and 6.0 mg of hydrocortisone per day, there is a significant improvement in the clinical picture and quality of life of the patient.

However, to define an individualized treatment for each patient, it is necessary for the physician to evaluate the clinical condition of this patient, use his laboratory tests as support for decision making of the dosage and from the daily release of hydrocortisone by the implants, start supplementation with partial doses, below the maximum possible production, to monitor the remission of symptoms and evolution of the clinical condition of the patient. After this first evaluation, the dose can be adjusted by inserting additional implants, if necessary. Furthermore, if rejection or any adverse reaction occurs after insertion of the implant, it may be removed within the first days of treatment.

The use of the implant proposed herein is safe and effective in the treatment of chronic adrenal insufficiency or hypercortisolism, considering that the therapy is independent of the patient's will or discipline for the action of the drug, thus ensuring the maintenance of dosage and regularity of treatment. It is noteworthy that patients affected by chronic diseases often discontinue treatment when they notice the reversal of symptoms or when they feel some discomfort due to side effects or adverse reactions, becoming more susceptible to a worsening of their clinical condition. Therefore, the use of these implants in the therapeutic approach prevents discontinuation and guarantees the appropriate treatment, as well as its efficacy.

Furthermore, the invention provides patients with chronic adrenal insufficiency with a therapy with constant and stable doses, of continuous release of the active ingredient. The constant maintenance of the dose allows a regulation more like the circadian rhythm of endogenous cortisol and does not block the remaining functional activity of the adrenal glands, maintaining the still existing physiological production.

Another benefit of this invention is that the release of the drug through the implants occurs directly into the bloodstream, which makes its action much more efficient and avoids a hepatic metabolism of the drug.

Another advantage of the invention is the type and form in which the implant is presented, biodegradable and resorbable, and it is not necessary to remove it after the treatment period, since it leaves no residue in the tissues.

A study was conducted to evaluate the efficacy of using the hydrocortisone implants described herein for the treatment of chronic adrenal insufficiency. Five patients affected by the disease were selected. Among the main symptoms reported by these patients are: excessive tiredness, low energy, weight increase, water retention, mental fatigue, insomnia, appetite for sweets, decreased immunity, increased pain sensitivity, anxiety, depression and difficulty in dealing with stressful situations. Saliva samples from these patients were collected to determine basal cortisol (TO) levels in the morning and decrease cortisol levels over 24 hours. The cortisol levels found in normal individuals, who do not have the pathology, are 13.1 to 23.5 nmol/L in the morning, 3.0 to 8.0 nmol/L in the afternoon and 1.0 to 2.9 nmol/L at night.

The results obtained for basal salivary cortisol (TO) in these patients were 8.86±0.89 nmol/L in the morning, 5.42±0.44 nmol/L in the afternoon and 3.5±0.57 at night. These results show a significant decrease in the levels of cortisol secreted by the adrenals throughout the day and consequent impairment of the responsiveness of the hypothalamus-hypophysis-adrenals axis, characteristic of this pathology.

To evaluate the response to treatment with the implants, the dosage used was three hydrocortisone implants with 100 mg each, inserted in the fat layer on the back of the patients.

After insertion of the implants, new saliva collections were performed in the morning, afternoon and evening: 24 hours after implantation (T1), five days after implantation (T5), seventeen days after implantation (T17) and ninety days after implantation (T90) to determine cortisol levels.

Figure 4:
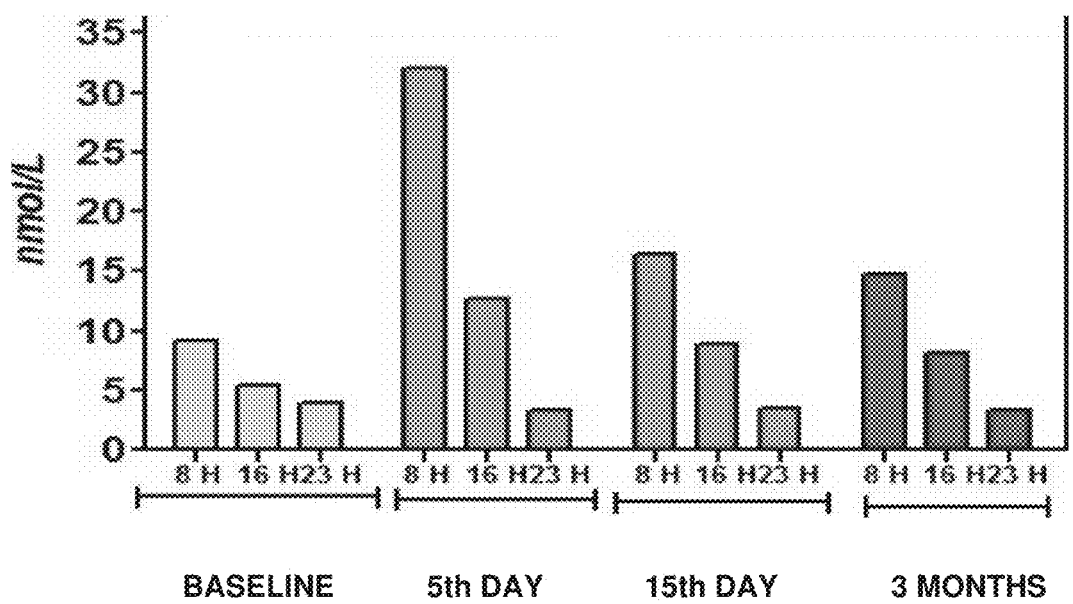
FIG. 4—shows a salivary cortisol chart of patients undergoing treatment with hydrocortisone implants.

Through the analysis of the data obtained from the salivary cortisol of the patients, it can be observed that all presented a significant increase in cortisol levels at time T1, reaching a maximum peak of release at time T5 and the maintenance of cortisol levels within the reference values expected after time T17. After 90 days (T90) the levels were maintained within the physiological normality. This behavior is Illustrated in the chart in FIG. 4.

It is possible to conclude from this study that the implant developed meets the purposes of the treatment for chronic adrenal insufficiency, since a continuous release of the drug was maintained for the minimum proposed period of 90 days, there was a recovery of normal physiological levels of cortisol over the 24 hours, there was a recovery of circadian rhythm in patients and great remission of adverse symptoms of the disease previously reported.

The invention claimed is:

1. A long-lasting reabsorbable subcutaneous implant with sustained release of pre-concentrated pharmacologically active substance for the treatment of chronic adrenal insufficiency or hypercortisolism comprising:
   a bioabsorbable polymer matrix;
   between 5 mg to 250 mg of hydrocortisone dispersed homogeneously in said bioabsorbable polymer matrix, said bioabsorbable polymer matrix having a weight that is between 1 percent and 20 percent that of said hydrocortisone.

2. The long-lasting reabsorbable subcutaneous implant according to claim 1, wherein said bioabsorbable polymer matrix is formed from a material selected from a group consisting of poly(D-lactic acid), poly(L-lactic acid), poly (racemic lactic acid), poly(glycolic acid), natural gum, synthetic gum and wax.

3. The long-lasting reabsorbable subcutaneous implant according to claim 1, wherein said hydrocortisone is mixed with said bioabsorbable polymer matrix to form a homogeneous mixture, wherein said homogenous mixture is dried and molded into said subcutaneous implant.

4. The long-lasting reabsorbable subcutaneous implant according to claim 3, wherein said homogenous mixture is formed by compression molding to form said subcutaneous implant, wherein said subcutaneous implant is sterilized by heat, in an oven at 90° C., for 1 hour.

5. The long-lasting reabsorbable subcutaneous implant according to claim 1, wherein at least part of said subcutaneous implant has a bioabsorbable coating, wherein said bioabsorbable coating has a thickness between 0.1 mm and 0.7 mm, said bioabsorbable coating containing poly(lactic-co-glycolic acid) and copolymers of D, L-lactic acid.

6. A long-lasting reabsorbable subcutaneous implant with sustained release of pre-concentrated pharmacologically active substance for the treatment of chronic adrenal insufficiency or hypercortisolism, comprising:
- 5 mg to 250 mg of hydrocortisone;
- a central core of a polymer matrix, wherein said hydrocortisone is intermixed with said polymer matrix and said polymer matrix has a weight that is between 1 percent and 20 percent that of said hydrocortisone;
- a non-degradable polymeric membrane coating at least part of said central core.

7. The long-lasting reabsorbable subcutaneous implant, according to claim 6, wherein said non-degradable polymeric membrane is selected from a group consisting of silicone, urethane, acrylates and their copolymers, copolymers of polyvinylidene fluoride, ethylene polyethylene vinyl acetate-vinyl and dimethylpolysiloxane, wherein said non-degradable polymeric membrane has a thickness between 0.2 mm and 1 mm.

* * * * *